(No Model.)

E. C. CONVERSE.
FLANGE JOINT FOR THIN METAL TUBING.

No. 283,975. Patented Aug. 28, 1883.

Witnesses
J. W. Cooke
Henry M. Knight

Inventor.
Edmund C. Converse
by James J. Kay
Attorney

UNITED STATES PATENT OFFICE.

EDMUND C. CONVERSE, OF PITTSBURG, PENNSYLVANIA.

FLANGE-JOINT FOR THIN-METAL TUBING.

SPECIFICATION forming part of Letters Patent No. 283,975, dated August 28, 1883.

Application filed March 21, 1883. (No model.)

*To all whom it may concern:*

Be it known that I, EDMUND C. CONVERSE, of Pittsburg, in the county of Allegheny and State of Pennsylvania, have invented new and useful Improvements in Flange-Joints for Thin-Metal Tubing; and I do hereby delare the following to be a full, clear, and exact description thereof.

My invention relates to means for coupling the thin or light wrought-metal tubing which is too thin to receive the ordinary screw-threads by which the ordinary thickness of wrought-metal tubing is connected. Heretofore different coupling devices have been employed for connecting this light-metal tubing, the ones found most efficient requiring the use of lead or similar calking material for sealing the joint, and these couplings all necessitated the melting out or removal of the calking material in order to disconnect the tubing. The time and trouble experienced in disconnecting this tubing have caused its use to be limited to permanent lines of tubing, wherein the tubing is seldom or never disturbed, and therefore a means for connecting this light wrought-metal tubing, whereby a joint can be rapidly connected and disconnected, as in case of the crushing or breaking of one section of tubing, or to change the position of the line of tubing, is much desired in the trade.

The object of my invention is to supply this need; and it consists, essentially, in forming at the ends of the two parts or halves of a flange-union or like coupling-connection extensions, provided on the interior with annular calking-recesses and locking seats or recesses, and securing these parts of the coupling-connection to the light-metal tubing by means of lugs on the tubing engaging with the locking-seats, and calking material within the calking-recesses, thus providing a coupling for this light-metal tubing which can be rapidly connected and disconnected, and which does not require the cutting into or weakening of the tubing.

To enable others skilled in the art to make and use my invention, I will describe its construction and manner of use, referring to the accompanying drawings, in which—

Figure 1:
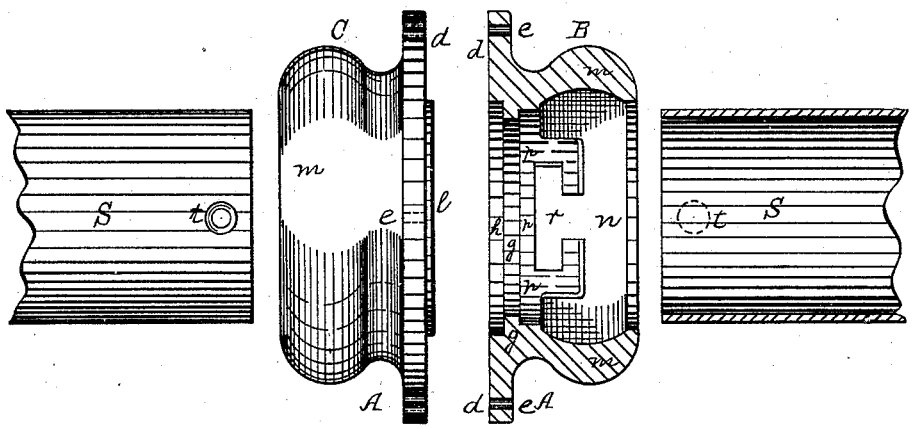
Figure 2:
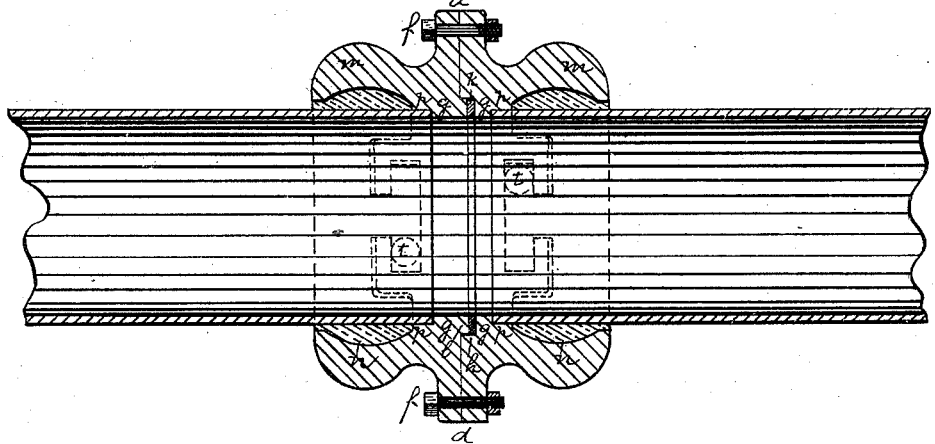

Figure 1 is a side view, partly in section, illustrating the parts of the flange-union when disconnected, and the tubing ready to be connected therein; and Fig. 2 is a longitudinal section, showing the coupling complete.

Like letters of reference indicate like parts in each.

The parts of the flange-union A are preferably cast to shape, and the flange-union is formed in two parts or halves, B C, each being provided with the flange $d$, provided with bolt-holes $e$, through which the bolts $f$ pass to connect the two halves of the union together, or the flanges being connected by other suitable connecting devices. Each half of the union is provided with the annular inner flange, $g$, which extends out so that its inner face is flush with the inner surface of the tubing to be connected, and within one or both halves is an annular seat, $h$, for the reception of a rubber, lead, or other suitable packing-ring, $k$, to form a tight joint between the two halves of the flange-union. The construction preferred by me is illustrated in the drawings, in which one part, B, has this annular seat $h$, and in the other part, C, the flange $g$ is extended out to form the annular lip $l$, which fits into the seat $h$ and holds the two parts in proper relative position before they are connected by the bolts, and also compresses the packing-ring $k$ within the seat. Each half or part of the flange-union is provided with the annular extension $m$, and at the end or mouth of this extension is the annular calking-recess $n$, the calking-recess having inwardly-flaring sides to hold the lead or other calking material employed. Between the calking-recess and the annular flange $g$ is the inner face or seat, $p$, within which the end of the tubing fits when it is secured within the extension $m$, its end face fitting against the annular flange $g$, and thus forming a smooth inner connection between the tubing and flange-union. Within the extension $m$ is the locking-seat $r$, which is preferably formed between the inner face, $p$, and the calking-recess $n$, the locking-seat being formed of one or more ribs extending across the interior of the extension, back of which ribs the extension is hollowed out for the reception of the locking-lugs on the tubing. Each section S of tubing is provided with the locking-lugs $t$ at or near the ends thereof, the lugs being adapted to engage within the locking-seats $r$ and hold the tubing within the extensions $m$ of the flange-union. The lugs are preferably riveted to the tubing, as shown, though they may be formed thereon in any desirable way.

The parts or halves of the flange-union are secured to the tubing in the following manner: The end of the tubing is slipped within the extension $m$ until its end rests within the inner face, $p$, and against the annular inner flange, $g$, the lugs $t$ passing between the ribs of the locking-seats $r$. The flange-half is then turned so as to lock the lug $t$ within the seat $r$, and the melted lead or other calking or packing material is then poured and calked or packed within the annular calking-recess $n$, the calking material entering within the locking-seat $r$ and locking the lug $t$ therein, and surrounding the tubing within the calking-recess and above the locking-connection. The several lengths of this thin-metal tubing thus provided with the parts or halves of the flange-union, can be connected together by means of the bolts $f$, or other connecting devices, tight joints being formed by the packing-rings $k$ within the annular seats $h$. They can also be disconnected at any time and another length or lengths inserted in case any length of the tubing should be crushed or injured, as by the falling of a heavy weight upon it, or in case it is desired to change the position of the line of tubing. I am thus enabled to employ this light-metal tubing in mines, and for many other uses for which it could not heretofore be used on account of the only efficient joint being a permanent one, and thus to greatly extend its use for the general purposes for which the ordinary thick wrought metal has been employed.

What I claim as my invention, and desire to secure by Letters Patent, is—

1. A flange-union formed of two parts or halves and suitable connecting devices, the parts being provided with extensions having annular calking-recesses at the ends thereof, and locking-seats below the mouths of said calking-recesses, in combination with thin-metal tubing provided with lugs adapted to engage with the locking-seats and be secured within the parts of the flange-union by calking material, substantially as and for the purposes set forth.

2. In flange-unions formed of the two parts B C and suitable connecting devices, the combination of the said parts B C, having the annular flanges $g$, inner faces, $p$, locking-seats $r$, and annular calking-recesses $u$ at the end thereof, with the thin-metal tubing S, having the lugs $t$, engaged within the locking-seats $r$, and adapted to be secured within the parts of the flange-union by calking material, substantially as and for the purposes set forth.

In testimony whereof I, the said EDMUND C. CONVERSE, have hereunto set my hand.

EDMUND C. CONVERSE.

Witnesses:
 JAMES B. MURRAY,
 JAS. L. DE LONG.